United States Patent [19]

Hofferber

[11] 4,039,165

[45] Aug. 2, 1977

[54] DERIVED RATE CIRCUIT FOR AIRCRAFT

[75] Inventor: Henry E. Hofferber, Phoenix, Ariz.

[73] Assignee: Sperry Rand Corporation, New York, N.Y.

[21] Appl. No.: 693,246

[22] Filed: June 4, 1976

[51] Int. Cl.² .............................................. G05D 1/10
[52] U.S. Cl. ................................ 244/177; 73/178 R; 235/150.2; 244/175; 318/580; 318/629; 318/654
[58] Field of Search ...................... 33/328; 73/178 R; 235/150.2, 150.25, 150.26, 150.27, 183; 244/175, 177, 181; 307/228; 318/580, 584, 585–586, 599, 629, 648, 654; 328/127; 324/163, 165, 173, 176

[56] References Cited

U.S. PATENT DOCUMENTS 3,848,172  11/1974  Thomas ........................... 244/177 X Primary Examiner—Stephen G. Kunin
Attorney, Agent, or Firm—Howard P. Teryl; Albert B. Cooper

[57] ABSTRACT

The circuit derives a rate signal from an a.c. signal proportional to attitude displacement provided, for example, from the synchro pickoff of a vertical gyroscope or an inertial navigation system, the pickoff receiving power from the aircraft a.c. power supply. The a.c. attitude signal is passed through a first bandpass filter tuned to the frequency of the power supply. The a.c. power supply signal is passed through a second bandpass filter identical to the first whose output is used as the reference signal for first and second identical demodulation circuits which include first and second matched low pass filters respectively. The filtered a.c. attitude signal is applied to the first demodulator circuit and the filtered power supply signal is applied to the second. The output of the first demodulator circuit is applied to a line voltage compensator and the output from the second demodulator circuit is applied to a d.c. to pulse width converter, the output of which being applied to control the gain of the line voltage compensator. The time constants of the attitude signal path and the reference signal path are matched to each other. The output of the line voltage compensator is applied to a rate taking circuit to provide the derivative of the attitude rate signal substantially free from power supply and many vertical gyro disturbances.

10 Claims, 2 Drawing Figures

DERIVED RATE CIRCUIT FOR AIRCRAFT

BACKGROUND OF THE INVENTION

2. Field of the Invention

The invention relates generally to devices for providing attitude rate signals and more particularly to circuits for electronically deriving rate from an attitude displacement signal.

2. Description of the Prior Art

Aircraft attitude rate has long been used in automatic pilots as a basic control signal. Such rate signals are often provided by rate gyroscopes, inertial rate sensors and integrating angular accelerometers. Such rate sensing devices tend to be expensive and although satisfactorily reliable for use in modern automatic pilots, less expensive and still more reliable rate sensors are desirable.

Alternatively, attitude displacement references such as pitch and roll vertical gyroscopes and electronic rate deriving networks have been utilized to provide the attitude rate signal. Although such arrangements are generally less expensive and more reliable than other rate sensing devices, such derived rate networks have been notoriously susceptible to power supply line voltage disturbances resulting in non-attitude related signal components causing undesirable control surface motion. Derived rate networks are particularly susceptible to electrical power supply transients and other noise components because such circuits take the derivative function of the input signal, hence magnifying and sharpening transient noise signals applied thereto. Such disturbances can result in aircraft surface motion resulting in undesired aircraft attitude changes, particularly with modern high speed aircraft having sensitive control surfaces. Attempts have been made in the past to reduce the effects of derived rate circuit noise susceptibility. For example, static compensation has been attempted by utilizing a line voltage compensator in the signal path. Although this effected an improvement as to static compensation, effects due to ripple and transient noise signals still resulted in undesirable non-attitude related outputs, particularly in modern high speed, high performance aircraft where extensive and complex demands are placed on the aircraft electrical systems, thus aggravating the derived rate noise susceptibility. In order to advantageously utilize derived rate networks in aircraft automatic pilot and flight director systems it is important that the attitude signal applied to the rate taker circuit is free of non-attitude related signal components, i.e., the derived rate signal to the aircraft autopilot servos or flight director indicators must be substantially noiseless.

The most significant noise contributions to the rate signals are associated with the aircraft power supply and the various equipment loads and additional noise contributions are associated with the characteristics of the signal generator pickoffs used in the attitude gyroscopes. Typical examples of undesirable noise components which must be compensated for are as follows:

A. Line voltage amplitude ripple. This is normally a continuous amplitude modulation of the aircraft's 400 Hz power supply derived from an engine driven alternator. The modulation is produced by the alternator and variations in the electrical loads placed on the power supply by various electrical equipment in the aircraft, the operating frequencies of such equipment reflecting in corresponding variations in the power supply. The most troublesome ripple frequencies are in the range of 1-20 Hz and those frequencies which produce a beat frequency in this range with the harmonics of 400 Hz since this is the range of maximum aircraft and control system response.

B. Line frequency modulation. The power supply line frequency may change with a variable recurrence rate. This can produce undesirable aircraft control signals in the control response region of 1-20 Hz.

C. Normal line voltage variations, surges and transients. These long term, step and impulse type variations in line voltage amplitude can be produced by increasing and decreasing demands placed on the aircraft power supply by the extensive and complex electrical equipment aboard modern aircraft.

D. Common power and ground connections. When one or more pieces of equipment share the same power or ground wiring as the attitude gyroscope displacement pickoff or the derived rate circuit power input, variable current demands from one equipment will reflect in voltage changes to the derived rate circuit. If the voltage change at the attitude gyroscope displacement pickoff differs from that of the 115 volt, 400 Hz supplied to the power input of the derived rate circuit, an undesirable noise in the rate circuit output may result.

E. Different attitude gyroscope signal pickoff generators. The same derived rate circuits may have to operate with different manufacturers gyroscopes which may include different manufacturers signal pickoff synchros and different phase shift correction networks associated therewith. The non-attitude signal content of the pickoff output may be different from that present in the 115 volt, 400 Hz power supply resulting in undesirable aircraft control surface motion.

Most of the above described noise components may be further aggravated at large aircraft attitude angles due to the increased amplitude of the attitude signals.

Thus it is the object of the present invention to provide a derived rate circuit for aircraft automatic pilots which substantially eliminates the foregoing disturbances so that they are not reflected in motion of the aircraft control surfaces.

SUMMARY OF THE INVENTION

The foregoing object is achieved in a derived rate circuit generally comprising a parallel path network supplying the input to a rate taking circuit, one path being responsive to the a.c. attitude displacement signal and the other path to the aircraft a.c. power supply which includes the power supply for the attitude gyroscope pickoff. The a.c. attitude signal and the a.c. power supply signal are passed through identical bandpass filters tuned to the power supply frequency. The outputs of the filters are applied to respective demodulator circuits which include identical demodulator filters, the output of the power supply bandpass filter being utilized as the a.c. reference voltage for each of the demodulator networks. The output of the demodulator in the attitude signal path is applied to a line voltage compensator and the demodulator output in the power supply path is applied to a d.c. to pulse width converter whose output is utilized to control the gain of the line voltage compensator. The output of the line voltage compensator is applied to a rate taker circuit for providing an attitude rate signal substantially free of the above discussed disturbances.

DESCRIPTION OF THE PREFERRED EMBODIMENT

Figure 1A:
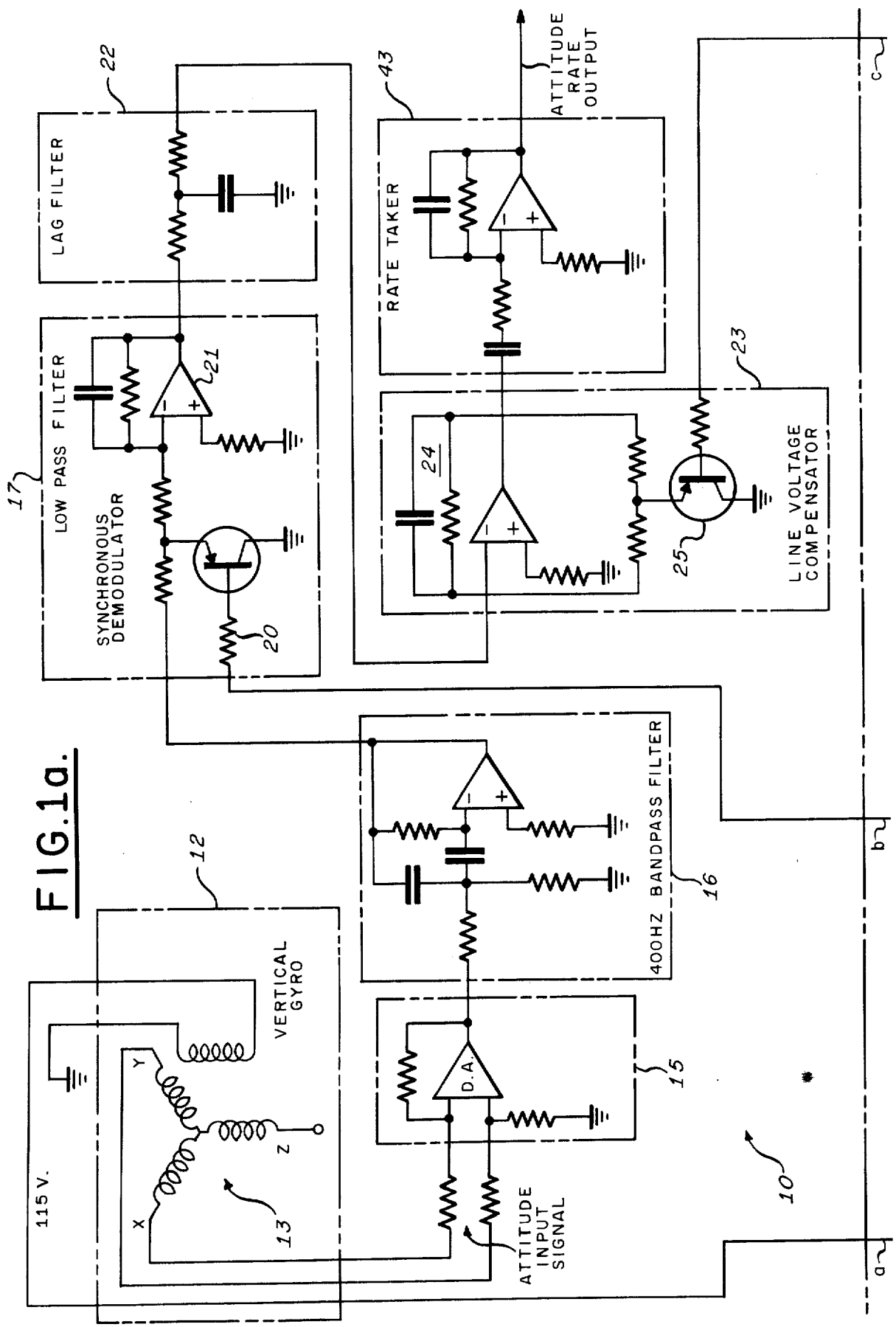
FIGS. 1a and 1b taken together comprise a schematic wiring diagram of the derived rate circuit of the present invention.
Figure 1B:
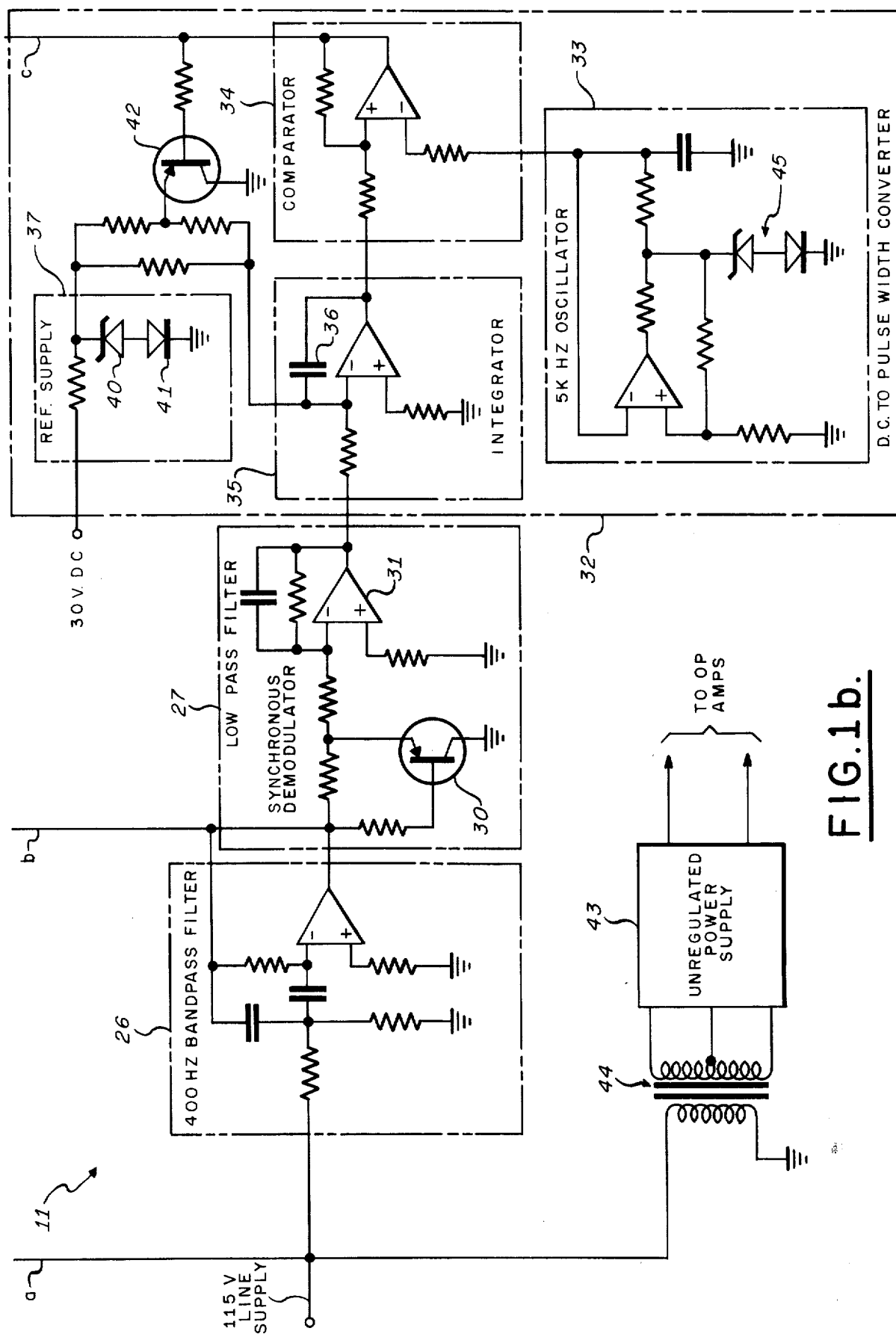

Referring now to FIGS. 1a and 1b, the derived rate circuit of the present invention is comprised of an attitude signal path 10 and a power supply reference signal path 11. An attitude signal source such as a vertical gyroscope 12 provides an attitude displacement output related, for example, to aircraft displacement about the pitch or roll axis of the craft. A synchro pick-off 13 receives 115 volt 400 Hz excitation from the 115 volt 400 Hz aircraft power supply.

The attitude displacement signal is obtained from the X-Y legs of the synchro pickoff 13 and applied to a differential amplifier 15 in the attitude signal path 10 of the rate deriving network. Utilizing the differential amplifier 15 rather than transformer coupling avoids the frequency response characteristics of an input transformer, improving the circuit frequency response matching thereby reducing power line ripple susceptibility. The output from the differential amplifier 15 is applied to a 400 Hz active bandpass filter 16 having a Q of 3.3. The passband of the filter 16 is such as to pass the 400 cycle power supply frequency with sidebands generally wide enough to encompass the autopilot control frequency range of from d.c. to approximately 30 Hz. Thus the filter 16 rejects continuous types of line voltage disturbances such as input ripple. The bandpass filter 16 permits various gyros with various synchro pickoffs to be interchangeably utilized with a minimum of ripple susceptibility.

The output from the 400 Hz bandpass filter 16 is applied to a synchronous demodulator and filter 17 comprised of a demodulator transistor 20 and an active low pass filter 21 for removing the 400 Hz carrier to obtain the d.c. attitude data. The filter 21 has a time constant of approximately 20 milliseconds and the reference excitation to the demodulator transistor 20 is provided from the line voltage reference path 11. The demodulator and filter 17 may have a transfer function of 1/(0.021S+1). The output from the demodulator and filter 17 is applied to a lag filter 22 having a 1 millisecond time constant. The lag filter 22 is utilized in the attitude displacement signal path 10 for time constant matching with respect to the line voltage reference path 11 in a manner to be explained.

The output from the lag filer 22 is applied to a line voltage compensator 23, the gain of which is rendered inversely proportional to the 115 volt 400 Hz power line voltage. The line voltage compensator 23 is capable of accommodating line voltage variations of ± 50 percent. The line voltage compensator 23 includes a 2 millisecond filter 24 for removing the 5 kHz pulse width signal to be later described. The line voltage compensator 23 also includes a chopper transistor 25 that receives its excitation from the line voltage reference path 11. A suitable transfer function for the line voltage compensator is 1/(0.002S+1).

Referring now to the line voltage reference path 11, the 115 volt 400 Hz aircraft line supply voltage is applied to a 400 Hz band pass filter 26 identical to the filter 16 for compensating power line disturbances in the reference path 11. The filtered reference signal from the filter 26 is applied to a demodulator and filter 27 which is matched to be identical to the demodulator and filter 17. The demodulator and filter 27 is comprised of a demodulating transistor 30 and a filter 31 corresponding to the elements 20 and 21 respectively of the demodulator and filter 17. The demodulator and filter 27 is utilized to remove the 400 Hz power line carrier and provide the d.c. power line disturbances. The filtered signal related to power line from the filter 26 is applied to the demodulator transistors 20 and 30 as the reference excitation. If the reference excitation to the demodulator transistors 20 and 30 were not filtered a phase variation in the power line voltage due to continuous ripple of different frequencies would negate the beneficial effect of the filter 16.

The output from the demodulator and filter 27 is applied to a d.c. to pulse width converter 32 that converts the d.c. reference signal related to power supply to a pulse train with duty cycle proportional to the reference voltage. The output from the converter 32 is applied to the chopper transistor 25 of the line voltage compensator 23 for controlling the gain thereof in accordance with the variations in line voltage. The gain of the compensator 23 is controlled in an inversely proportional manner with respect to the line voltage variations whereby when the line voltage increases by a certain percentage, the gain of the compensator circuit 23 is decreased by the same percentage, and when the line voltage decreases by a certain percentage, the gain of the compensator 23 is increased by the same percentage.

The d.c. to pulse width converter 32 is generally of conventional design and comprises a 5 kHz sawtooth wave oscillator 33 that provides an input to a compensator 34, the other input thereto being provided by an integrator 35. The integrator 35 with its feedback capacitor 36 has a time constant that is matched by the time constant of the lag filter 22 in the attitude signal path 10. A regulated reference supply 37 connected to a 30 volt d.c. regulated power supply in the flight control equipment provides a reference level for the converter 32 with respect to which gain changes of the line voltage compensator 23 are referenced. The reference supply 37 includes a zener diode 40 to impart additional regulation with respect to the 30 volt d.c. supply and a temperature compensation diode 41. The converter 32 further includes a chopper circuit 42 responsive to the input of the comparator 34 for controlling the gain in the feedback path of the pulse width converter 32.

When the 115 volt line voltage is at its nominal value, the output of the integrator 35 is providing approximately 0 volts to the positive input to the comparator 34. The oscillator 33 provides a sawtooth waveform with peak voltages of from −6 to +6 volts. The instantaneous voltage of the sawtooth waveform that is equal to the output of the integrator 35 determines the time at which the comparator 34 switches and thus determines the duty cycle of the pulse train waveform provided thereby. The variable duty cycle pulse train waveform provided by the comparator 34 applied to the chopper 42 adjusts the voltage to the summing junction at the negative input of the integrator 35 until this input is reduced to zero. The pulse train waveform is also applied to the chopper 25 to control the gain of the line voltage compensator 23.

When the line voltage increases or decreases with respect to its nominal value, the line voltage reference signal from the filter 31 increases and decreases, which in turn changes the output of the integrator 35. This in turn affects the comparison point with the sawtooth waveform from the oscillator 33 thus changing the duty cycle of the pulse train waveform from the comparator 34. The duty cycle changes and the chopper circuit 42 adjusts the signal at the summing junction input to the integrator 35 until this error signal input is again reduced to zero. The pulse train output from the comparator 34 with the adjusted duty cycle changes the gain of the line voltage compensator 23 so as to compensate for the line voltage fluctuations.

Thus it is appreciated that the elements of the converter 32 form a closed loop circuit for converting the d.c. line voltage reference signal to a variable pulse width signal for controlling the gain of the line voltage compensator 23 via the chopper 25. It will be appreciated that the choppers 25 and 42 are matched with respect to each other. A suitable time constant for the pulse width converter 32 is $K/0.001S+1$.

It will be appreciated that because the filters 16 and 26, the demodulators 20 and 30, the filters 21 and 31 and the choppers 25 and 42 are identical with respect to each other and the lag circuit 22 is utilized to match the lag of the integrator 35, the time constants of the attitude displacement path 10 are matched to those of the line voltage reference path 11, thus providing a dynamic match with respect to the two paths. Additionally, the two paths are statically matched with respect to each other by reason of the operation of the line voltage compensator 23. Since the two parallel paths, one path being responsive to the attitude displacement signal and the other path to the aircraft power line, have been matched statically and dynamically, line voltage disturbances in the attitude signal are minimized and the output from the line volage compensator 23 is substantially line voltage invariant.

The line voltage invariant attitude signal from the compensator 23 is applied to a rate taker or differentiating circuit 43, the output of which is proportional to aircraft attitude rate. If the signal input to the rate taker 43 had no-attitude related line voltage disturbances on it, these disturbances would be multiplied by an exceedingly large factor with respect to the desired signal.

The operational amplifiers of the derived rate network illustrated receive power from an unregulated power supply 43 coupled via a transformer 44 to the aircraft 115 volt a.c. line supply.

It is necessary for the operation of the derived rate network that the output waveform from the oscillator 33 remain voltage invariant. Zener diodes 45 in the feedback path of the oscillator 33 provide the necessary voltage control such that the unregulated power supply 43 may be utilized for providing the power to the circuit. It will be appreciated that the line voltage compensator 23 and the d.c. to pulse width converter 32 may be replaced by an analog multiplier or divider circuit provided its power supply is regulated. It will furthermore be appreciated that any line voltage compensation means in the attitude signal path responsive to changes in the line voltage may be utilized to the same effect provided that the time constants with respect to the paths 10 and 12 remain matched.

It will be appreciated from the foregoing that the primary source of power supply noise is the aircraft alternator power supply itself and the various equipment loads powered thereby. Much of the equipment have their own oscillators and loading and unloading requirements which introduce audio frequencies, surges and transients onto the power line. The rotating power supply generator itself also creates harmonic type noise. These various continuous type noise components range in frequency from around 1 Hz to about 15 kHz and the transients, for example, may be as large as 600 volts depending on the equipment load being switched on and off. Additionally, the gyro synchro pickoff has a frequency response of its own which alters the spectral distribution of the line voltage noise in accordance with its response. Thus in prior art arrangements since the attitude signal channel had a different frequency response from the line voltage reference channel, line voltage compensation was not adequately effective. Additionally, since in prior art derived rate networks, the time constants in the two channels were generally different, transients and surges were not adequately compensated. These various frequencies including harmonics of the power supply frequency caused beat outputs within the aircraft control passband of from approximately 1 to 20 Hz thereby causing spurious displacements of the attitude control surfaces.

The bandpass filters 16 and 26 filter out most of the above-described continuous signal disturbances, thus permitting noiseless rate to be derived from various gyros with various synchro pickoffs, without the requirement for gyro compensating networks. Thus attitude rate may be derived from various gyros with the minimum of ripple susceptibility. The bandpass filters 16 and 26 eliminate beat outputs due to phase modulation of the excitation voltage. Since the line voltage compensator 23 can only compensate when the same percentage change occurs on its signal and excitation inputs, care must be taken with the ground and highside signal and excitation leads. Common ground noise might increase circuit susceptibility. The addition of the bandpass filters 16 and 26 make the circuit less susceptible to common ground noise at frequencies other than 400 Hz. The 20 millisecond filters 21 and 31 tend to remove the high frequency components of transient signals and the line voltage compensator 23 removes the low frequency components thereafter. Since the time constants in the signal paths 10 and 11 are matched, transients and surges may effectively be removed from the power line signal.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A rate deriving circuit for use in aircraft having an a.c. power supply providing an a.c. power signal subject to undesired disturbance components and an attitude displacement sensor, said rate deriving circuit and said attitude displacement sensor receiving excitation from said a.c. power signal, said attitude sensor providing an a.c. signal in accordance with attitude displacements of said aircraft, said rate deriving circuit comprising an attitude displacement signal path and a power supply reference path, said attitude displacement signal path comprising:

first band pass filter means responsive to said a.c. attitude displacement signal and tuned to the frequency of said a.c. power signal for filtering said a.c. attitude displacement signal, thereby providing a filtered attitude displacement signal, first demodulator means coupled to said first band pass filter means for demodulating said filtered attitude displacement signal thereby providing a demodulated filtered attitude displacement signal and line voltage compensator means coupled to said first demodulator means and to said power supply reference path for compensating said demodulated filtered attitude displacement signal with respect to said disturbance components, thereby providing a compensated attitude displacement signal, said power supply reference path comprising second band pass filter means responsive to said a.c. power signal and tuned to the frequency thereof for filtering said a.c. power signal, thereby providing a filtered a.c. power signal and second demodulator means coupled to said second bandpass filter means for demodulating said filtered a.c. power signal, thereby providing a reference signal in accordance with said a.c. power signal, said line voltage compensator means being responsive to said reference signal for providing said compensated attitude displacement signal, and derivative circuit means responsive to said compensated attitude displacement signal for providing a substantially disturbance free signal proportional to the rate of change of said attitude displacement signal.

2. The rate deriving circuit of claim 1 in which said attitude displacement signal path and said power supply reference path have matched time constants with respect to each other.

3. The rate deriving circuit of claim 1 in which said power supply reference path further includes coupling means for coupling said reference signal to said line voltage compensator means thereby controlling the gain thereof in accordance with said reference signal.

4. The rate deriving circuit of claim 3 in which said coupling means comprises pulse width converter means for converting said reference signal into a pulse signal having a duty cycle which varies in accordance with said reference signal, said line voltage compensator means further including chopper means responsive to said pulse signal for controlling the gain of said line voltage compensator means in accordance with said duty cycle of the pulse signal.

5. The rate deriving circuit of claim 4 in which said attitude displacement signal path further includes lag circuit means for compensating lag introduced into said power supply reference path by said pulse with converter means.

6. The rate deriving circuit of claim 1 in which the filtered a.c. power signal from said second bandpass filter means provides the reference signal to said first and second demodulator means.

7. The rate deriving circuit of claim 1 in which said first and second bandpass filter means comprise narrow bandpass filters tuned to said frequency of said a.c. power signal.

8. The rate deriving circuit of claim 2 in which said first and second bandpass filter means comprise filters with time constants matched with respect to each other and said first and second demodulator means comprise demodulators and filters respectively with time constants matched with respect to each other.

9. The rate deriving circuit of claim 1 in which said attitude displacement signal path further includes differential amplifier means coupling said attitude displacement sensor to said first bandpass filter means.

10. In an automatic pilot system for aircraft including an aircraft alternating current power supply subject to undesired disturbance components and a gyroscopic attitude displacement reference means including signal generating means energized by said power supply for supplying an a.c. signal proportional to the attitude displacement of said aircraft about an axis thereof and including said undesired disturbance components, electronic means for deriving attitude rates from said attitude displacement signal substantially free of said disturbance components for stabilizing aircraft motion about said axis comprising a. first demodulator means responsive to said attitude displacement signal for supplying a demodulated attitude signal proportional thereto, b. second demodulator means responsive to said a.c. power supply for providing a d.c. signal proportional to at least a first characteristic of said disturbance components of said power supply, c. pulse width amplifier means responsive to said second demodulator means for supplying a pulse d.c. signal, the pulse width being proportional to at least said first characteristic of said disturbance components, d. combining means responsive to said demodulated attitude signal and to said d.c. pulse width signal for substantially removing at least said first characteristic of said disturbance components from said demodulated attitude signal and for accordingly providing an output, e. a first bandpass filter means responsive to said a.c. attitude signal for suppressing at least a second characteristic of said disturbance components therein, f. second bandpass filter means responsive to said a.c. power supply for suppressing therein at least said second characteristic of said disturbance components and for accordingly providing an output, g. means for supplying said output of said second bandpass filter means to said demodulator means as the a.c. reference therefor, whereby said output of said combining means is a d.c. signal substantially free of said disturbance components, and h. derivative circuit means responsive to the output of said combining means for providing a substantially disturbance free signal proportional to the rate of change of said attitude displacement signal.

* * * * *